(12) United States Patent
Osle

(10) Patent No.: US 7,412,910 B2
(45) Date of Patent: Aug. 19, 2008

(54) MECHANISM FOR TRANSFORMING A ROTATIONAL MOVEMENT INTO A LINEAR MOVEMENT

(75) Inventor: Miguel Domingo Osle, Bilbao (ES)

(73) Assignee: SENER, INGENIERIA Y SISTEMAS, S.A. (ES)

( * ) Notice: Subject to any disclaimer, the term of this patent is extended or adjusted under 35 U.S.C. 154(b) by 792 days.

(21) Appl. No.: 10/996,736

(22) Filed: Nov. 24, 2004

(65) Prior Publication Data
US 2006/0213294 A1    Sep. 28, 2006

(30) Foreign Application Priority Data
Nov. 25, 2003    (EP) .................................. 03380272

(51) Int. Cl.
*F16H 1/18*    (2006.01)

(52) U.S. Cl. ............... 74/424.94; 74/424.96; 74/424.71

(58) Field of Classification Search .................. 74/89.3, 74/424.71, 424.94, 424.96, 424.6, 424.5, 74/424.7
See application file for complete search history.

(56) References Cited

U.S. PATENT DOCUMENTS

| | | | | |
|---|---|---|---|---|
| 2,492,115 A | * | 12/1949 | Crowther | .................... 411/353 |
| 4,065,979 A | * | 1/1978 | Killian | ..................... 74/424.94 |
| 4,155,268 A | * | 5/1979 | Lee et al. | ................. 74/424.78 |
| 4,322,987 A | * | 4/1982 | Gartner | ................... 74/424.94 |
| 4,884,677 A | * | 12/1989 | Yu et al. | ................ 198/370.02 |
| 6,619,898 B1 | * | 9/2003 | Cosenza | ..................... 411/353 |

* cited by examiner

*Primary Examiner*—David M Fenstermacher
(74) *Attorney, Agent, or Firm*—Ostrolenk, Faber, Gerb & Soffen, LLP

(57) ABSTRACT

A mechanism for transforming a rotational movement into a linear movement, comprising a non-deformable nut, that is prevented from rotating but not from axially moving, a radially deformable tubular screw, having freedom of rotation but not of axial movement and having a pitch equal to that of the nut but of a slightly external smaller diameter than the internal diameter of the nut. A pushing device inside the screw, with the ability to rotate and to push against the internal wall surface of the screw at least at three circumferentially equidistant points so as to radially deform the screw wall outwards, until bringing the screw wall to rest against and screw into the nut at an equal number of points. The pushing device may be constituted of independent rolling elements like rolling bearings on a core on a support or may be a cam in contact with the screw or through rolling elements.

18 Claims, 4 Drawing Sheets

MECHANISM FOR TRANSFORMING A ROTATIONAL MOVEMENT INTO A LINEAR MOVEMENT

BACKGROUND OF THE INVENTION

The present invention refers to a mechanism for transforming a rotational movement into a linear movement, and hereinafter called linear transformation mechanism. It is especially applicable within the aerospace industry.

Aerospace exploitation has required the advance of a new technology of high precision and reliability. Engineering has had to face problems such as the deployment of solar panels, craft coupling, etc., in which high mass restrictions and very strict specifications prevail.

Currently, one of the most demanding fields is the deployment of antennas after launch of a vehicle and subsequent positioning of the antenna in a continuous manner, for which high precision and highly efficient linear movements, originating from rotational movements, are necessary.

Systems existing on the market for transforming a rotational movement into a linear movement offer excellent load and efficiency ranges, but not in combination with feed rates per revolution in the order of tens of microns and not in the combination of various mechanisms of interest to comply with these requirements, due to the consequent weight gain, volume increase, and loss of efficiency and reliability.

In applications of linear transformation mechanisms, two clear tendencies can be distinguished, namely those giving precedence to a very small feed per revolution for operations of adjustment or trimming, orientation, guidance, ... etc. with high efficiency, and those giving priority to the ability to move large loads and their irreversibility for the deployment of appendages (booms, antennas . . . ) and their maintenance in the final position.

Mechanisms with the purpose described not only have an application within the aerospace field, but may also provide a good choice for use in a machine tool, which requires great precision in linear positioning, or even for use in lifting mechanisms, given their load capacity, due to the great reduction they provide.

Basically, the systems developed until now for the orientation of antennas start from small revolutions caused by "stepper" and geared motors of a very different nature (Harmonic Drive, Planetary Systems, . . . ). The angle most suitable for emitting and receiving signals in antennas on satellites, aircraft . . . , is directly oriented in this way.

A new line followed by the applicant consists in adjustment or trimming systems starting from the rotation of a plane according to predetermined axis systems. The difference in this case is in the concept used to achieve the precise and irreversible rotational movement.

The concept is to fix a point of the plane by means of a ball joint, allowing rotation thereon. On the other hand, two other ball joints are symmetrically joined to the plane, but they have vertical movement ability. Angles of rotation of a magnitude much lower than previous systems are thus obtained.

To obtain upward or downward movement of the latter two points, linear transformation reducing systems fed by the rotation of a "stepper" motor are used. Linear transformation systems are also applicable in deployment mechanisms, usable in equipment and systems requiring prior firm structural fastening. Typical examples include antennas, deployable appendages such as solar panels and deployable radiators, aeronautics, military equipment, etc.

These components should be strongly anchored to the structure of the satellite to survive launch loads on them, whereas in order to be operative, they must be in a different configuration, decoupled, distanced or disconnected from the structure of the satellite. Appendages such as antennas, radiating solar panels, experiments, protective covers, etc., may have to be deployed once the vehicle is in an operative position.

Basically, three types of mechanisms currently exist which can be compared in some aspects with the proposed transformation mechanism. These are known as roller screws, harmonic screws and harmonic drive.

Roller screws imply a step forward with respect to ball screws for some applications. Ball recirculation screws are characterized by their high efficiency in the transformation of movement. This advantage is due to the use of balls between the nut and the screw for transmitting stresses through rolling and not through sliding, as in the most conventional systems. Nevertheless, since the balls need axial space, they have limited pitch reduction. Replacement with rollers allows maintaining the rolling contact together with the longitudinal decrease between thread faces, making feeds per revolution as small as half a millimeter possible. A very high efficiency and a very low feed per revolution ability are achieved with these systems, but they are not low enough for applications of the type set forth.

"Harmonic screw", encompasses all mechanisms which use a deformable screw and a nut to achieve a very reduced pitch in the transformation of rotational into translational movement. In all cases, very accurate positioning is sought. But, the efficiency of actuation is not taken into account, nor is the design of the screw and the wave generator for providing the mechanism with a large load capacity provided for. A mechanism of this type is disclosed in U.S. Pat. No. 2,979, 964. U.S. Pat. No. 4,557,153 discloses a type of harmonic screw having rollers which each push against one point of the deformable screw so as to achieve a contact zone with the nut. This gives little stability to the assembly and reduces its load capacity. Furthermore, those rollers do not have balls or rollers of smaller diameter facilitating the rolling and favoring high efficiency of the mechanism. Very reduced pitches are obtained with this type of mechanism, but they do not achieve high efficiency nor a large load capacity.

Finally, harmonic drive consists of a simple mechanism with which a great reduction and high efficiency and load capacity are obtained. But it provides a reduction from rotational movement to rotational movement, i.e. it constitutes a reducer, and there is meshing between its parts at two points. The working principle consists of a flexible ring which, by means of a slightly elliptical bearing, is cyclically deformed to achieve meshing with an outer, non-deformable ring, wherein the reduction increasing as the difference in diameter between the flexible ring and the non-deformable ring decreases.

Meshing between the flexible ring and the non-deformable ring is equivalent to pure rolling due to friction between the elements mentioned. As the outer non-deformable ring is fixed, the flexible ring will be the one to roll on its interior perimeter. Conceptually, this system is very suitable due to its high reduction and compact form. Nevertheless, the ellipsoidal bearing, known as Wave Generator, offers a very poor support for the typical axial loads of a linear transformation mechanism.

SUMMARY OF THE INVENTION

The object of the present invention is to provide a linear transformation mechanism which, starting from an initial rotational movement, provides a linear movement of great precision with high efficiency.

The mechanism of the invention is of the type comprising a non-deformable nut, which is prevented from rotating but not from moving axially, a radially deformable tubular screw disposed in the nut, and a device for a pushing on the screw. The screw can rotate freely but cannot move axially. The screw has the same pitch as the nut but a slightly smaller diameter than the internal diameter of the nut, meaning that when the screw is pressed by the pushing device against the nut at a plurality of points while the remainder of the circumference of the screw is at a slight distance inward of the internal surface of the nut so that the screw and the nut will engage at the points, but are unlikely to engage elsewhere around the circumference. A pushing means or device is placed inside the tubular screw and are rotatable with respect to that screw. The pushing means or device rest and push against the wall of the tubular screw at circumferentially equidistant points, so as to radially deform the wall outwards, until it rests against and screws onto the nut at an equal number of points.

Starting from this construction, in the mechanism of the invention, the pushing means rests against the internal surface of the tubular screw at least at three equidistant points. In one possible embodiment, these resting points are comprised of the same number of independent rolling elements comprised of bearings for causing rolling movement between the screw and the nut, and are assembled in just as many cylindrical cores equidistant and parallel to the shaft of the screw, which project from a support located inside the screw, and are rotatable with respect to the screw, and which are intended to be connected to the shaft of a drive motor, for example through a flexible coaxial element, by which two rotational degrees of freedom are achieved.

Each one of the rolling elements rests against the internal surface of the wall of the screw, in an axial direction, along a length approximately equal to that of the working zone of the screw on the nut. The deformation of the screw should thus have enough width to provide stability and to make the screw rigid.

In another possible embodiment, the pushing device is a cam with points on it, and the rotating cam points press on the internal surface of the screw.

In yet another embodiment, also using a cam with points, there are rolling elements as a bearing between the cam and the internal surface of the screw.

In all embodiments, the point, the rolling elements at the points of the bearing at the points are adapted to reduce drag on the pushing device.

The wall of the tubular screw extends on one side into at least one portion without thread, through which said screw is assembled onto the support by means of bearings.

For achieving a good deformation-length ratio in the screw its screw threads may have transverse interruptions. Furthermore, the portion wall thereof without threads can be provided with holes. These features all reduce inertia.

In the mechanism of the invention, the pushing means preferably rests against the internal surface of the tubular screw at three points.

In applications in the aerospace field, good levels of precision in the linear actuators are obtained with other existing mechanisms combining various reductions (for example a harmonic drive for a large rotation-to-rotation reduction and a roller screw for transforming rotation into translation). Very fine precision is obtained with the mechanism of the invention in a single step, which allows reducing mass, decreasing the volume occupied and improving system reliability. All of these are key parameters in aerospace applications and in some industrial applications.

The mechanism of the invention has an efficiency comparable to that of current systems that it aims to release. For aerospace applications, energy consumption is critical.

The elements to be deployed and handled such as antennas, panels... usually suffer orbital accelerations in orbit that may affect their good performance. The mechanism of the invention is irreversible under those load conditions.

As a result of such a large reduction obtained, the output force is very high in relation to its size. Depending on the application, the special bearing and the deformable screw may be designed to support high loads.

Six characteristic advantages of the mechanism of the invention are here defined. Some of these are provided in already existing mechanisms, but in no case are all the advantages included in the same mechanism:

1. Rotation to translation transformation system.
2. High precision (feed per revolution of less than 20 microns).
3. High efficiency, comparable to current systems.
4. Ability to behave as highly irreversible.
5. High load capacity. Transmission of axial forces and moments.
6. Conceptual simplicity and simplicity of use to provide high reliability.

In a single compact and light mechanism, a high precision is obtained (a very small feed), with a high efficiency and a good load capacity and irreversibility.

With respect to roller screws, the mechanism of the invention achieves a much smaller pitch, the efficiency of the mechanism being of the same order.

With respect to the harmonic screw, the mechanism of the invention provides high efficiency and load capacity, with the same possibilities of fine positioning.

Regarding the harmonic drive, this does not transform rotation into translation. It does achieve a great reduction, high efficiency and load capacity, but it is a reduction from rotational movement to rotational movement. It is a reducer and there is meshing between its parts at two points.

All the advantages and features set forth will be better understood with the following description, made with reference to the attached drawings, in which one embodiment is shown.

Other features and advantages of the present invention will become apparent from the following description of the invention which refers to the accompanying drawings.

BRIEF DESCRIPTION OF THE DRAWINGS

FIG. 8A shows an unthreaded portion. FIG. 8B shows a threaded portion and FIG. 8C shows a top view of the threading.

DETAILED DESCRIPTION OF EMBODIMENTS OF THE INVENTION

Figure 1:
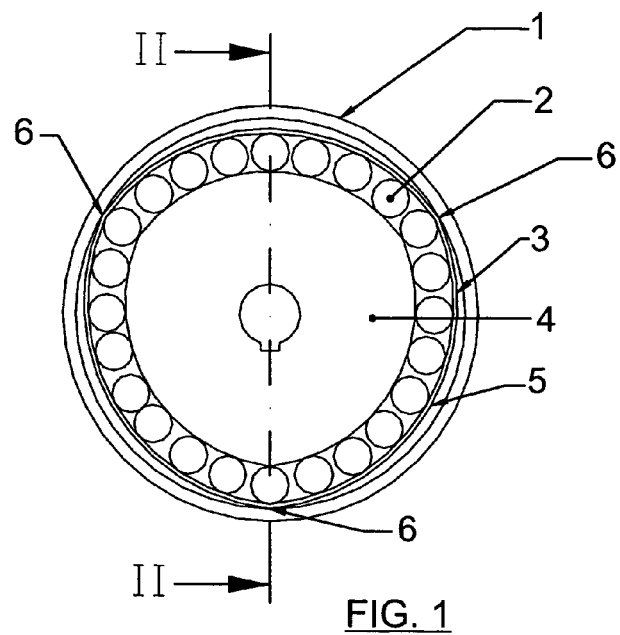
FIG. 1 shows a front elevation view of a simplified linear transformation mechanism according to one embodiment of the invention.
Figure 2:
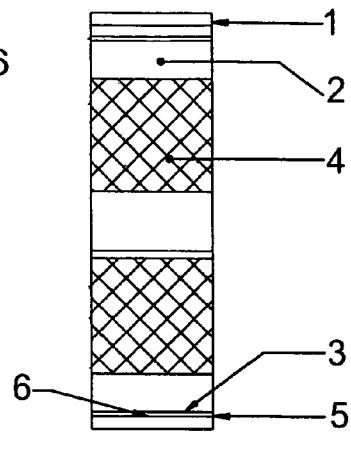
FIG. 2 shows a diametrical section of the mechanism, taken along the II-II cut line in FIG. 1.

FIGS. 1 and 2 show a first embodiment of a linear transformation mechanism comprised of a non-deformable nut 1, with restricted rotation but freedom of longitudinal movement, a radially deformable tubular screw 3 inward of the nut 1, which can rotate freely in the nut but cannot move axially and which has the same pitch as the nut but a slightly smaller diameter than the internal diameter of the nut and a bearing 2 inward of the screw 3 and comprised of a row of adjacent independently rotatable rolling elements which engage the screw.

The bearing 2 has a generally triangular elliptical internal path defined by the correspondingly externally profiled cam 4 and the bearing 2 has a correspondingly profiled, thin and flexible external path 5.

Figure 4:
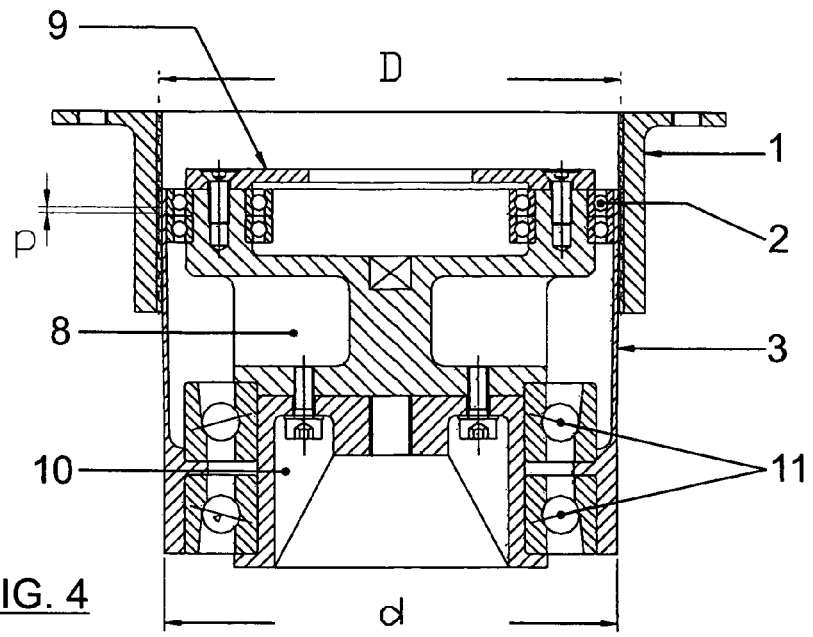
FIG. 4 shows a diametrical sectional view of a third preferred embodiment of the mechanism of the invention.

The tubular screw 3 is of a deformable nature. With reference to FIG. 4, to explain what are the dimensions herein described, the tubular screw comprises a very thin and flexible tube of diameter d, less than diameter D of the nut in this case, with the screw having an external thread of the same pitch p as the nut 1. The screw has restricted translation but has rotational freedom.

The bearing 2 is housed inside the deformable screw 3 and the bearing shape makes the screw adopt the elliptical-triangular form in its threaded zone, defining three vertices in the deformed screw which mesh with the nut 1, given that the two threads, of the screw and the nut, have the same pitch per revolution. The function of the bearing is to deform and push the deformable screw 3 outwards in a radial direction, so that it rests against the internal surface of the nut 1.

By rotating the bearing 2 with respect to the nut 1, the deformable screw 3 rolls without sliding round the nut 1 at its three contact points. The bearing reduces drag on the screw. When the bearing 2 has completed a revolution with respect to the nut 1, the contact points 6 also have also done so, said points covering a length equal to the perimeter of the pitch diameter of the nut D.

Figure 3:
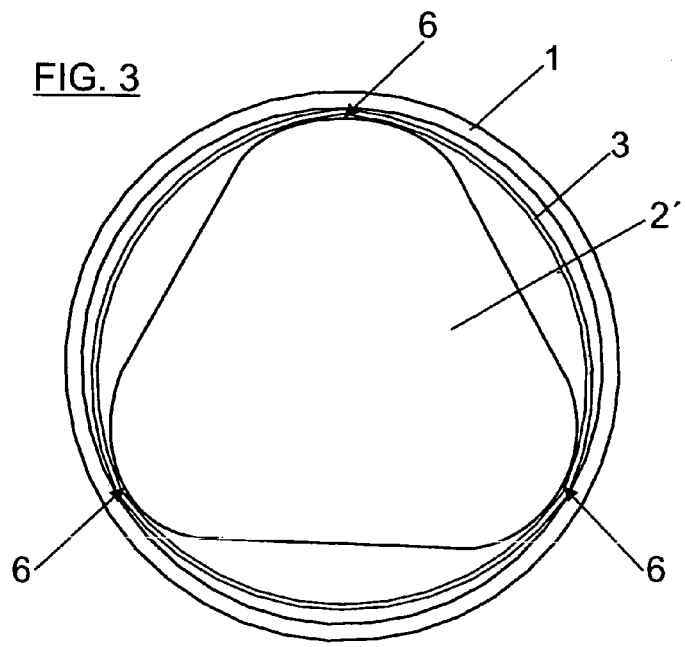
FIG. 3 shows a similar view to FIG. 1, with a simplified second embodiment of the bearing used in the invention.

In the second embodiment of FIG. 3, the bearing 2 has been substituted by a Teflon cam 2' which defines three contact points 6 between screw 3 and nut 1. The contact points are of a strong but friction reducing material that reduces drag on the screw. The screw 3 has transverse interruptions in the screwthread to achieve a greater flexibility thereof.

Obviously, the contact points 6 of the nut are the same for each revolution, but this is not the case for those of the screw 1 which, since it has a smaller periphery, will enter into contact at the corresponding point to peripherally cover the perimeter of the pitch diameter of the nut, which will be somewhat advanced with respect to that of the previous revolution. Nevertheless, this length is equivalent to D/d times the periphery of the original diameter of the screw 1. Thus, the new contact point between the screw 1 is (D/d)−1 revolutions ahead of the starting point. As the contact point with respect to the nut 1 has not rotated, the screw 3 will have rotated in the direction opposite to the special bearing 2-2'. Taking into account that the screw 3 rotates, but is not translated, the nut 1 will have to move the axial distance corresponding to (D/d)−1 revolutions of the helix of pitch per revolution p.

Therefore, the pitch per revolution of the mechanism will be p.((D/d)−1), p being the pitch, D the diameter of the nut 1 and d the external diameter of the screw 3.

As the following is also complied with: D−d=2δ and d=2R, δ being the deformation and R the radius.

Therefore it can be determined with:

$$p\left[\frac{\delta+R}{R}-1\right]$$

For any case in which R=33 mm, it would be:

With δ=0.4 mm and p=1.5 mm, a pitch per revolution is 0.018 mm/revolution.

In conclusion, a feed per revolution in the order of tens of microns is obtained with a single reduction step.

Figure 5:
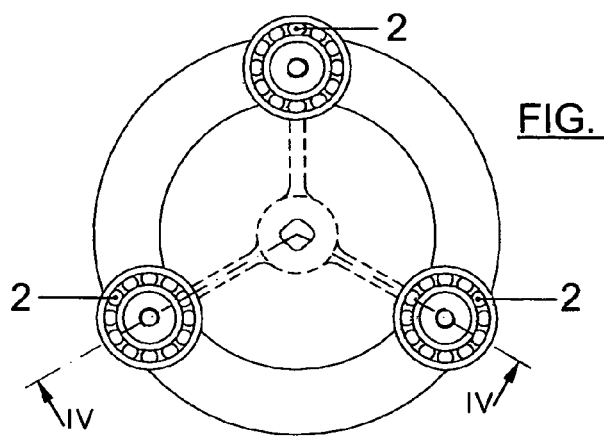
FIG. 5 shows a plan view of the support of the bearings constituting the pushing means of the mechanism in FIG. 4.
Figure 6:
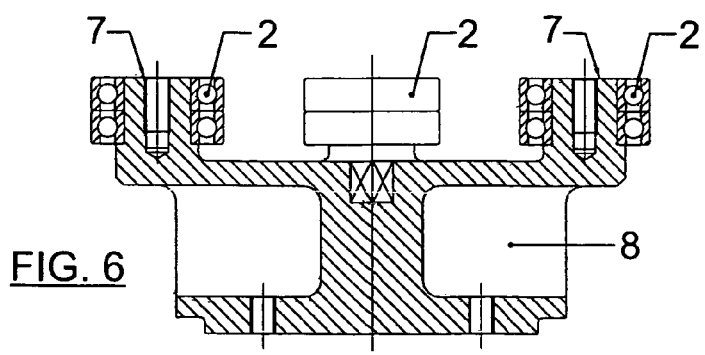
FIG. 6 shows a sectional view of the support, taken along the VI-VI cut line in FIG. 5.

FIGS. 4 to 6 show a linear transformation mechanism of high precision, efficiency, load capacity and irreversibility, according to a third preferred embodiment which, as with the mechanisms described with reference to FIGS. 1 to 3, comprises an internally threaded nut 1 meshing with the external thread of a tubular screw 3, having a thin and flexible wall in three equidistant zones, corresponding to zones 6 of FIGS. 1 to 3, due to the action of three groups of equidistant bearings 2 acting as pushers resting against the internal surface of the tubular screw 3. Said sets of bearings 2 resting against the internal surface of the screw 3 at three points cause a rolling movement between the tubular screw 3 and the nut 1.

Each set of bearings 2 is assembled on a cylindrical core 7, which extends parallel to the shaft of nut 1. The cores 7 project from a support 8 which is located inside the screw 3, and the support is rotatable with respect to the screw.

As with the embodiments of FIGS. 1 to 3, in the mechanism in FIG. 4, the nut 1 has restricted rotation but may freely move in an axial direction, whereas the screw 3 has restricted axial translation but can rotate freely.

As can be seen in FIG. 4, the bearings 2 are assembled on the cores 7 and remain positioned on the bracket 8 and retained by upper cover 9. Furthermore, the support 8 has a lower cover 10 fixed to it, through which rotational movement is induced in the support 8. Between this cover 10 and the wall of the screw 3, a pair of angular contact bearings 11 is arranged. FIG. 4 also shows the diameter D of the nut 1, the diameter d of the tubular screw 3 and the thread pitch p.

Figure 7:
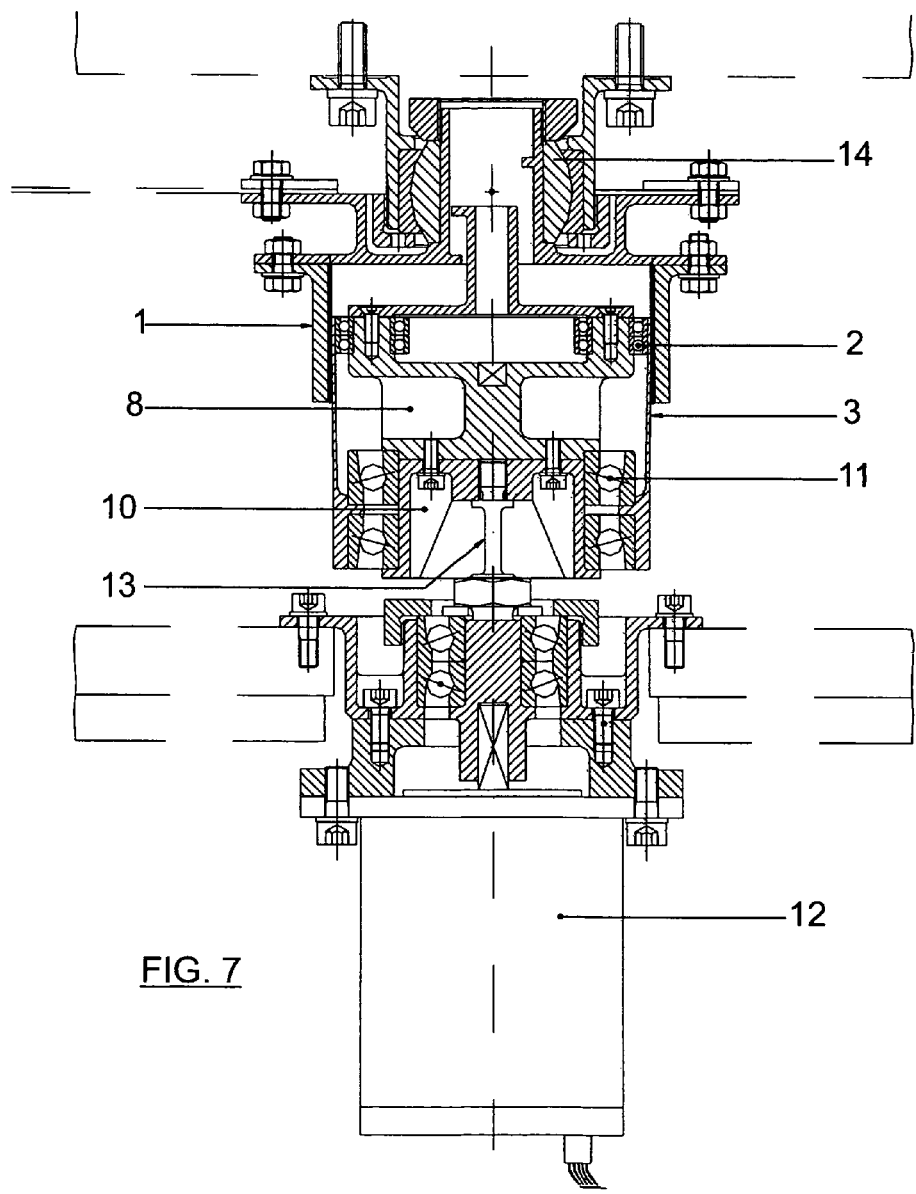
FIG. 7 shows a diametrical sectional view of a linear actuator including the mechanism of the invention.

Through the lower cover 10, the support 8 is made to rotate and, with the support, the set of bearings 2 is made to rotate. Therefore, the deformation of the screw 3 is conveyed circularly. The smaller diameter of the screw 3 with respect to the nut 1 makes the screw 3 rotate in the opposite direction and at a much lower speed. The nut 1, which is restricted in rotation, moves as a result of the thread with a pitch per revolution of p((D−d)−1). FIG. 7 shows a linear actuator containing the embodiment of the linear transformation mechanism of FIGS. 4 to 6. The actuator includes a motor 12 which rotates the support 8 by means of a flexible element 13 providing two rotational degrees of freedom. In the other interface away from the motor, corresponding to that of the element or apparatus to be aimed, a ball-and-socket connection 14 for providing rotation to the aimed element can be arranged.

One possible application of the mechanism of the invention is aiming antennas with two linear actuators, each containing a transformation mechanism, such as the embodiment shown in FIGS. 4 and 5. The idea comprises fixing a point of the plane to be oriented (interface plane of the antenna) by means of a ball joint 14 allowing rotation thereon. On the other hand, two other ball joints 14 are symmetrically joined to the plane, but these have vertical movement ability (these are the linear actuators as shown in FIG. 7, each one containing a linear transformation mechanism as shown in FIGS. 4 to 6). The three ball joints form an isosceles triangle to facilitate control of the overall mechanism. By varying the length of a linear actuator, a rotation is obtained with respect to the axis containing the other two ball joints. As the pitch of the linear movement is a minimum value, of the order already indicated, the angles of rotation (which depend on the distance between ball joints) are much lower than those of systems existing on the market.

In the mechanism of the invention, the contact between the screw 3 and the nut 1 cannot be exact, but must occur in a longitudinal direction along a stretch having the same width as the working zone of the screw 3. This can be achieved by the embodiment of FIGS. 1 to 3, or by the embodiment of FIGS. 4 to 5, where bearings 2 of smaller diameter are used, but with a sufficient height to cause the deformation of the screw 3 along a stretch of sufficient length.

Figure 8:
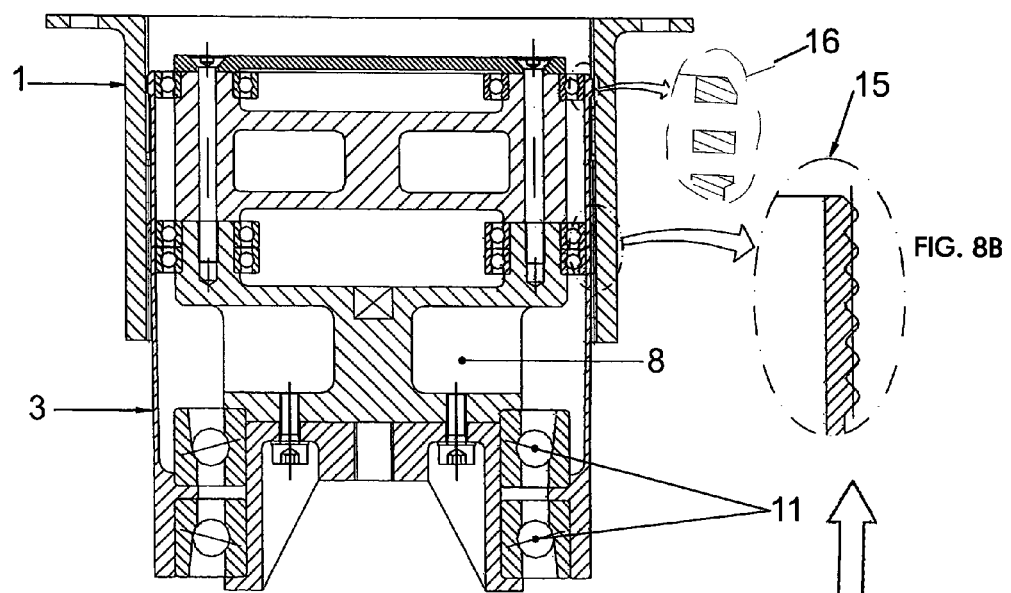
FIG. 8 shows a diametrical sectional view of a fourth embodiment with additional features.
Figure 8:
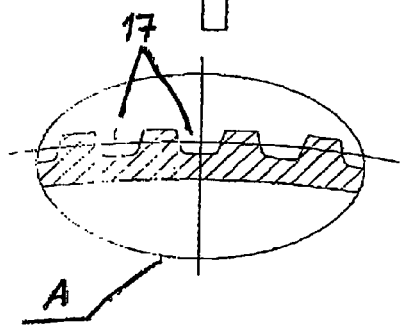

As seen in FIG. 4 and also in FIG. 8, the tubular screw 3 extends axially underneath the nut 1 in a stretch without thread, to which the support 8 is assembled by the bearings 11. Both the screw 3 and the nut 1 can be provided with respective threaded stretches with equal pitch, which are referenced with number 15 in FIG. 8 and can be of a noticeably equal length on both components, with respective toothed stretches, referenced with number 16 in FIG. 8 and can also be of equal length on both components, or the teeth of the nut 1 can be of a greater length and those of the screw 3 of a smaller length. Thus, a screw connection between the screw 3 and the nut 1 at the stretch 15 and a meshing at the stretch 16 are ensured. The object is to ensure the rolling without the need of a tightening between the deformable screw and the nut. This system also ensures a specific pitch which is independent of the manufacturing tolerances in the diameters of the nut and the screw.

In order to obtain a deformable screw 3 with a good deformation-length ratio, a reduction in inertia can be resorted to, achieved by means of longitudinal cuts 17 in the screwthreads of corresponding threaded stretch 15 of the screw 3, and in the formation of holes 18 made in the portion 16 of the screw 3 without thread shown in FIG. 8 as above the stretch 15. FIG. 8C is a partial top view in cross-section of a threaded region showing the cuts 17. These holes 18 can also serve to restrict the axial ability of the mechanism when it is acting against a stop. The deformable screw 3 buckles and prevents the overload of the external elements. These cuts and holes may be used in all the embodiments hereof.

The pitch of the linear transformation mechanism of the invention depends on the ratio between diameter D of the nut 1 and diameter d of the deformable screw 3. When manufacturing these parts, both diameters will be affected by manufacture tolerances which will affect the final pitch of the linear transformation mechanism. With the object of achieving a constant pitch in a series of mechanisms, it is possible to introduce a system which corrects the relative position between the two parts every certain number of degrees (for example 120°). A simple manner is through pegs on the nut 1 which should mesh in the transverse sections of the deformable screw, correcting the advance a little if it is necessary to achieve the pre-established nominal pitch.

The toothed stretches 16 can coincide with the threaded stretches 15 or remain axially separate therefrom.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mechanism for transforming a rotational movement into a linear movement, comprising:
   a non-deformable nut, which is prevented from rotating but not from axially moving, the nut having an internal surface with an internal diameter;
   a radially deformable, tubular screw inside the nut and having an external surface and an external diameter, the screw being rotatable freely but not moveable axially, the screw external surface and the nut internal surface having respective equal pitch, the screw external diameter is slightly smaller than the internal diameter of the nut; the screw also having an internal wall defined by a respective second internal surface thereof;
   a pushing device placed in the tubular screw, and rotatable with respect to the screw and resting against and pushing against the second internal surface of the internal wall of the tubular screw at at least three circumferentially equidistant points, and the pushing device is operable for radially deforming the wall of the screw outward until the wall rests against and screws onto the nut at the circumferentially equidistant points; and a drag reducing device at each of the points for reducing drag between the pushing device and the second internal surface of the internal wall of the screw as the pushing device rotates;
   the pushing device rests against the internal surface of the tubular screw at least at the three circumferentially equidistant points; the pushing device comprises a respective independent rolling element located at the at least three circumferentially equidistant points; each of the rolling elements comprising bearings located and operable for causing a rolling movement between the screw and the nut;
   the rolling elements are assembled on as many cylindrical cores as the at least three points, located equidistant around and parallel to a shaft of the screw; and
   a support located inside the screw, rotatable with respect to the screw, and the rolling elements projecting from the support.

2. A mechanism according to claim 1, wherein each of the rolling elements rests against the internal surface of the wall of the screw and extend over an axial direction along a stretch of a length approximately equal to the length of the respective drag reducing device on the nut.

3. A mechanism according to claim 1, wherein the second internal surface of the screw has threads with transverse interruptions.

4. A mechanism according to claim 1, wherein the external surface of the tubular screw has one extended side extending into a portion of the external surface thereof without threading thereon.

5. A mechanism according to claim 4, wherein the portion of wall of the tubular screw without threads is provided with holes.

6. A mechanism according to claim 1, wherein the support carrying the cylindrical cores is connected to a shaft of a drive motor; a flexible coaxial element, which provides two rotational degrees of freedom, connecting the cores to the shaft of the drive motor.

7. A mechanism according to claim 1, further comprising a ball-and-socket connection connecting the nut to an element to be moved.

8. A mechanism according to claim 1, wherein the nut and the screw have respective opposing surfaces with coinciding toothing, by which both components mesh with one another during the axial movement of the nut.

9. A mechanism for transforming a rotational movement into a linear movement, comprising:
 a non-deformable nut, which is prevented from rotating but not from axially moving, the nut having an internal diameter;
 a radially deformable, tubular screw inside the nut and having an external diameter; the screw being rotatable freely but not moveable axially, the screw and the nut having respective equal pitch, the screw has the slightly smaller external diameter than the internal diameter of the nut; the screw also having an interior wall defined by an internal surface;
 a pushing device placed in the interior of the tubular screw and rotatable with respect to the screw, resting against and pushing against the internal surface of the wall of the tubular screw at a plurality of circumferentially equidistant points, and operable for radially deforming the wall of the screw outward until the wall rests against and screws onto the nut at the circumferentially equidistant points;
 the pushing device rests against the internal surface of the tubular screw at least at three points; the pushing device comprises independent rolling elements located at the at least three points and operable for causing a rolling movement between the screw and the nut.

10. A mechanism for transforming a rotational movement into a linear movement, comprising:
 a non-deformable nut, which is prevented from rotating but not from axially moving, the nut having an internal surface with an internal diameter;
 a radially deformable, tubular screw inside the nut and having an external surface and an external diameter, the screw being rotatable freely but not moveable axially, the screw external surface and the nut internal surface having respective equal pitch, the screw external diameter is slightly smaller than the internal diameter of the nut; the screw also having an internal wall defined by a respective second internal surface thereof;
 a pushing device placed in the tubular screw, and rotatable with respect to the screw and resting against and pushing against the second internal surface of the internal wall of the tubular screw at a plurality of circumferentially equidistant points, and the pushing device is operable for radially deforming the wall of the screw outward until the wall rests against and screws onto the nut at the circumferentially equidistant points; and a device at each of the circumferentially equidistant points for reducing drag between the pushing device and the second internal surface of the internal wall of the screw as the pushing device rotates.

11. A mechanism according to claim 10, wherein the second internal surface of the screw has threads with transverse interruptions.

12. A mechanism according to claim 10, wherein the external surface of the tubular screw has one extended side extending into a portion of the external surface thereof without threading thereon.

13. A mechanism according to claim 12, wherein the portion of wall of the tubular screw without threads is provided with holes.

14. A mechanism according to claim 10, further comprising a ball-and-socket connection connecting the nut to an element to be moved.

15. A mechanism according to claim 10, wherein the nut and the screw have respective opposing surfaces with coinciding toothing, by which the nut and the screw mesh with one another during the axial movement of the nut.

16. A mechanism according to claim 10, wherein the pushing device includes a generally triangular shaped cam having the circumferentially equidistant points thereon which together define a diameter of the external surface of the screw at the internal surface and internal diameter of the nut and the circumferentially equidistant points define the device for reducing drag.

17. A mechanism according to claim 16, wherein each of the points is spaced radially inward from the second internal surface of the screw; and
 rolling elements disposed between the exterior of the pushing device and the second internal surface of the screw and the rolling elements define the device for reducing drag.

18. A mechanism of claim 16, wherein the points press onto the second internal surface of the screw at the contact of the external surface of the screw with the internal surface of the nut.

* * * * *